United States Patent
Okubo

(10) Patent No.: US 7,253,726 B2
(45) Date of Patent: Aug. 7, 2007

(54) TIRE CONDITION MONITORING APPARATUS, TRANSMITTER, AND RECEIVER

(75) Inventor: Youichi Okubo, Gifu-ken (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 121 days.

(21) Appl. No.: 11/069,813

(22) Filed: Feb. 28, 2005

(65) Prior Publication Data

US 2006/0055524 A1  Mar. 16, 2006

(30) Foreign Application Priority Data

Aug. 26, 2004 (JP) ............... 2004-247156

(51) Int. Cl.
*B60C 23/00* (2006.01)
*H04Q 5/22* (2006.01)

(52) U.S. Cl. .............. 340/447; 340/442; 340/445; 73/146.5

(58) Field of Classification Search ........ 340/445, 340/447, 426.33
See application file for complete search history.

(56) References Cited

U.S. PATENT DOCUMENTS 5,483,827 A * 1/1996 Kulka et al. ............ 73/146.5
5,573,610 A * 11/1996 Koch et al. ............ 152/152.1
5,880,363 A    3/1999 Meyer
6,486,773 B1 * 11/2002 Bailie et al. ............ 340/445
2004/0135681 A1 * 7/2004 Tsujita ............ 340/442

FOREIGN PATENT DOCUMENTS

| DE | 19632150 | 2/1998 |
|---|---|---|
| EP | 1197356 | 4/2002 |
| EP | 1270276 | 6/2002 |
| JP | 3212311 B2 | 7/2001 |
| WO | WO 93/16891 A1 | 9/1993 |
| WO | 03/068536 | 8/2003 |

* cited by examiner

*Primary Examiner*—Donnie L. Crosland
(74) *Attorney, Agent, or Firm*—Crompton, Seager & Tufte, LLC

(57) ABSTRACT

A tire condition monitoring apparatus comprises transmitters and a receiver. Each transmitter is provided in a tire and the receiver is provided in a body frame of a vehicle. The apparatus further comprises initiators each corresponding to one of the transmitters. Based on a trigger signal from the corresponding initiator, each transmitter wirelessly transmits a predetermined determination signal, which includes tire information, two or more times in a fixed time period from the transmission circuit. The determination signal from the transmission circuit is received by the reception circuit of the receiver and a controller determines whether there is a match between the received determination signals. When there is a match, the position of the tire is located and the tire information is processed as valid information.

2 Claims, 6 Drawing Sheets

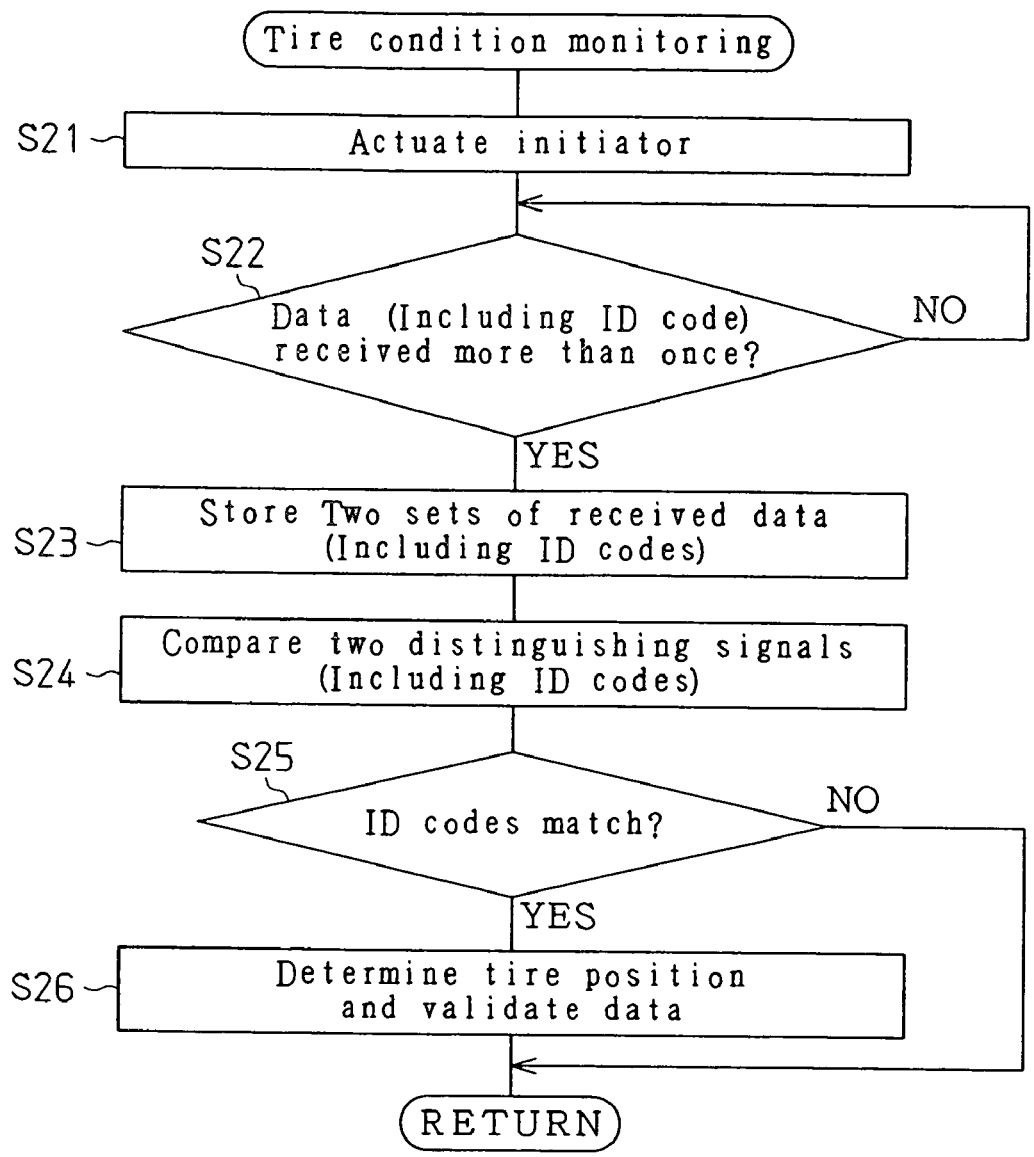

TIRE CONDITION MONITORING APPARATUS, TRANSMITTER, AND RECEIVER

BACKGROUND OF THE INVENTION

The present invention relates to a wireless tire condition monitoring apparatus that allows a driver in a vehicle passenger compartment to check vehicle tire condition such as an air pressure, and to a transmitter and a receiver that are used for the apparatus.

Wireless tire condition monitoring apparatuses that allow a driver in a vehicle passenger compartment to check the condition of vehicle tires have been proposed. A tire condition monitoring apparatus includes transmitters and a receiver. Each of the transmitters is attached to the wheel rim of the tire so as to be located in the tire, and the receiver is located in the body frame of the vehicle. The transmitter detects the condition of the corresponding tire, such as the internal pressure and the interior temperature of the tire, and wirelessly transmits a signal including the detection data of the tire condition via an antenna. The receiver receives the signal having been wirelessly transmitted from the transmitter and displays information about the tire condition on a display when necessary. The display is located, for example, in the passenger compartment.

Other tire condition monitoring apparatuses are conventionally proposed that transmit and receive a signal including the detection data of the tire condition together with identification information (ID code), which is set for each tire, and identify the detection data and the position of the tire (for example, Patent Document 1: Japanese Patent No. 3212311). In such conventional apparatuses, a specific identification code is given to each transmitter. Each transmitter transmits signals that include data of tire condition and a given ID code.

On the other hand, the ID codes of all the transmitters associated with the vehicle on which the receiver is mounted are registered in the receiver. When the ID code included in the received signal matches with one of the registered ID codes, the receiver locates the position of the tire according to the ID code and continues processing the received signal. However, if the ID code included in the received signal differs from all of the registered ID codes, the receiver does not process the received signal. Therefore, the receiver is prevented from erroneously processing signals from a transmitter of another vehicle that is not associated with the vehicle on which the receiver is mounted.

However, in the conventional apparatus of Patent Document 1, prior to the monitoring of tire condition, it is necessary to switch an operation mode of the receiver from a tire condition monitoring mode to an ID code registration mode, and it is necessary to set and register the ID code of the transmitter for each tire. Thus, the registration of ID codes becomes troublesome and the monitoring of tire condition cannot be started quickly.

SUMMARY OF THE INVENTION

The present invention was made for solving the above problems in the prior art. An objective of the present invention is to provide a tire condition monitoring apparatus which is capable of quickly starting monitoring tire condition without registering identification information beforehand for each tire, and a transmitter and a receiver which are used for the apparatus.

To achieve the foregoing and other objectives in accordance with the purpose of the present invention, a tire condition monitoring apparatus having a plurality of tire information transmitting devices, each provided in one of tires of a vehicle is provided. Each tire information transmitting device wirelessly transmits tire information. The tire condition monitoring apparatus receives the tire information from the tire information transmitting devices and monitors a condition of each tire. The apparatus includes a plurality of trigger signal transmitting devices, a plurality of determination signal transmitting devices, a receiving device, and a determining device. Each trigger signal transmitting device corresponds to one of the tire information transmitting devices. Each trigger signal transmitting device wirelessly transmits a trigger signal to the corresponding tire information transmitting device. Each determination signal transmitting device is provided in one of the tire information transmitting devices. Each determination signal transmitting device wirelessly transmits a predetermined determination signal two or more times within a fixed time period based on the trigger signal from the corresponding trigger signal transmitting device. The determination signal includes the tire information. The receiving device receives the determination signals from the determination signal transmitting devices. The determining device determines whether there is a match between a plurality of determination signals received by the receiving device and, when there is a match, locates a position of the corresponding tire and processes the tire information as valid information.

The present invention provides another tire condition monitoring apparatus having a plurality of tire information transmitting devices, each provided in one of tires of a vehicle. Each tire information transmitting device wirelessly transmits tire information. The tire condition monitoring apparatus receives the tire information from the tire information transmitting devices and monitors a condition of each tire. The apparatus includes a plurality of storage devices, a plurality of instruction signal transmitting devices, a plurality of identification signal transmitting devices, a receiving device, and a determining device. Each storage device is provided in one of the tire information transmitting devices and stores identification information of the corresponding tire. Each instruction signal transmitting device corresponds to one of the tire information transmitting devices and wirelessly transmits an instruction signal to instruct the corresponding tire information transmitting device to transmit an identification signal based on the identification information stored in the corresponding storage device. Each identification signal transmitting device is provided in one of the tire information transmitting devices and wirelessly transmits the identification signal with the tire information based on the instruction signal from the corresponding instruction signal transmitting device. The receiving device receives the identification signal from the identification signal transmitting device. The determining device determines whether there is a match between the identification signal received by the receiving device and the identification signal instructed to one of the instruction signal transmitting devices and, when there is a match, locates a position of the corresponding tire and processes the tire information as valid information.

The present invention also provides a transmitter used for a tire condition monitoring apparatus. The transmitter has a tire information transmitting device provided in a rim of one of tires of a vehicle to wirelessly transmit tire information. The tire condition monitoring apparatus receives the tire information from the tire information transmitting device and monitors a condition of the tire. The transmitter includes a trigger signal transmitting device and a determination signal transmitting device. The trigger signal transmitting device corresponds to the tire information transmitting device and wirelessly transmits a trigger signal to the tire information transmitting device. The determination signal transmitting device is provided in the tire information transmitting device and tirelessly transmits a predetermined determination signal two or more times within a fixed time period based on the trigger signal from the trigger signal transmitting device. The determination signal includes the tire information.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a flowchart showing the monitoring of a tire in a tire condition monitoring apparatus according to a second embodiment.

DETAILED DESCRIPTION OF THE PREFERRED EMBODIMENTS

First Embodiment

A first embodiment of the present invention will now be described with reference to FIGS. 1 to 5.

Figure 1:
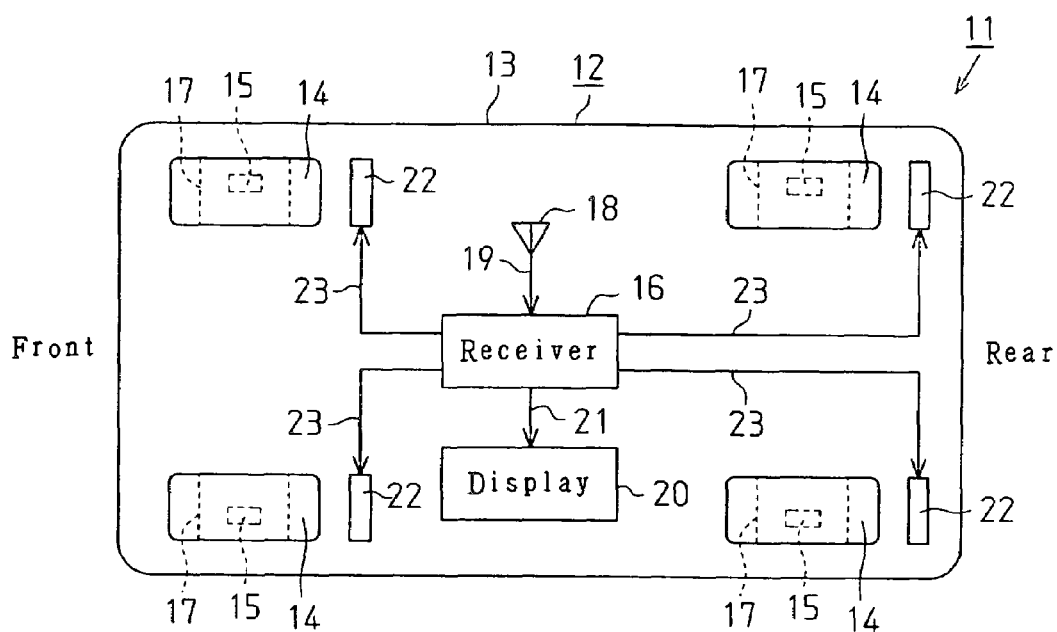
FIG. 1 is a block diagram illustrating a tire condition monitoring apparatus according to a first embodiment.

As shown in FIG. 1, a tire condition monitoring apparatus 11 of the present embodiment includes four transmitters 15 and a single receiver 16. Each of the transmitters 15 is disposed on a different one of four tires 14 attached to a body frame 13 of a vehicle 12. The receiver 16 is installed in the body frame 13 of the vehicle 12. Each transmitter 15 is located in one of the tires 14 and is fixed to the outer surface of a rim 17 to which the tire 14 is attached. Each transmitter 15 functions as tire information transmitting means or a tire information transmitting device which measures and collects data of tire condition such as an internal pressure and an interior temperature of the corresponding tire 14, and then wirelessly transmits a signal including tire information obtained through the measurement.

As shown in FIG. 1, the receiver 16 is located at a predetermined position on the body frame 13 and is activated by, e.g., electricity from a battery (not shown) installed in the vehicle 12. At least one reception antenna 18 is connected to the receiver 16 via a cable 19. The receiver 16 functions as monitoring means or a monitoring device which receives the signal wirelessly transmitted from each of the transmitters 15 via the reception antenna 18 and monitors the condition of each of the tires 14. A display 20 is connected to the receiver 16 via a cable 21 and is located within a visible range of a driver in a vehicle passenger compartment of the vehicle 12.

As shown in FIG. 1, four initiators 22 corresponding to the transmitters 15 are disposed and connected to the receiver 16 via cables 23. Each of the initiators 22 is fixed to a fender or the like which is a nonmetallic insulator made of a material such as a synthetic resin. The fenders are attached to the body frame 13 so as to correspond to each of the tires 14. Each initiator 22 includes a transmission coil, which is formed by winding a coil a predetermined number of times around a ferrite core, and a capacitor tuned to a resonant frequency. Each initiator 22 functions as trigger signal transmitting means or a trigger signal transmitting device which wirelessly transmits a trigger signal under the control of the receiver 16. When each transmitter 15 receives the trigger signal from the corresponding initiator 22, the transmitter 15 immediately measures the air pressure of the tire 14 and wirelessly transmits a signal including air pressure data obtained through the measurement.

Figure 2:
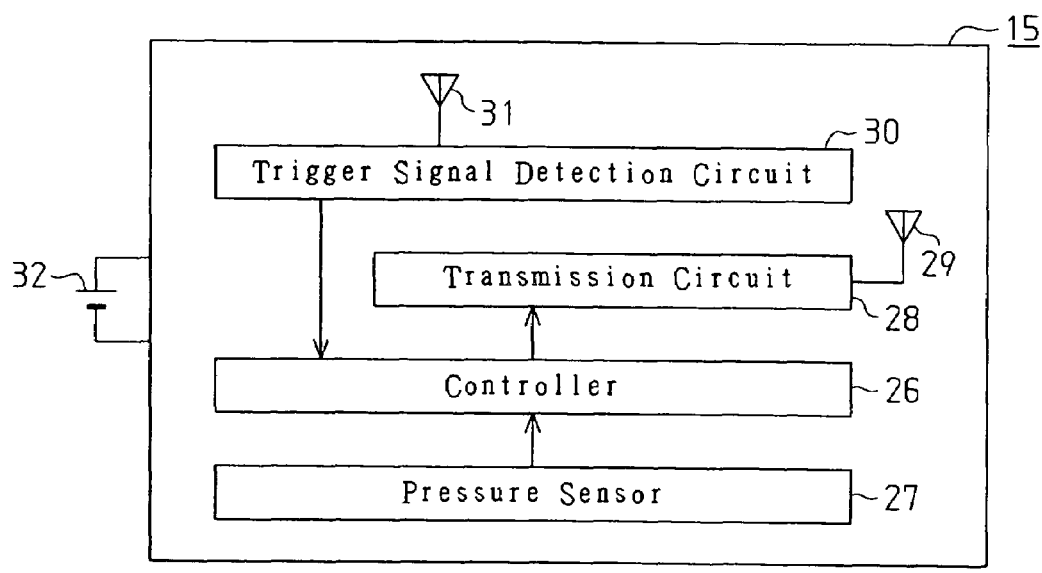
FIG. 2 is a block diagram showing a transmitter in the tire monitoring apparatus of FIG. 1.

The configuration of each transmitter 15 will be described in detail below. As shown in FIG. 2, the transmitter 15 comprises a controller 26 which includes a microcomputer. The controller 26 includes, for example, a central processing unit (CPU), read only memory (ROM), and random access memory (RAM).

Figure 5A:
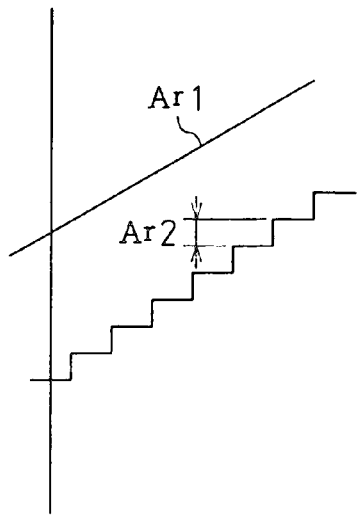
FIG. 5(a) is a chart showing the relationship between an air pressure and a resolution.

A pressure sensor 27 measures the air pressure of the tire 14 and outputs tire air pressure data, which has been obtained through the measurement, to a controller 26. The controller 26 outputs the inputted air pressure data to a transmission circuit 28. The transmission circuit 28 functions as determination signal transmitting means or a determination signal transmitting device which encodes and modulates air pressure data received from the controller 26, generates a determination signal, and wirelessly transmits the determination signal via a transmission antenna 29 two or more times in a fixed time period. For example, a measured air pressure is converted into an 8-bit code and is analog modulated before transmission. Therefore, as shown in FIG. 5(a), an actual air pressure Ar1 indicates each predetermined range Ar2 of consecutive air pressures in an encoded state. In other words, the predetermined range Ar2 is the minimum resolution indicating an air pressure Ar1 during transmission and reception. In this embodiment, the minimum resolution is converted into a tire air pressure of 2.5 kPa.

A trigger signal detection circuit 30 functions as trigger signal detecting means or a trigger signal detecting device which detects a trigger signal from the corresponding initiator 22 via a trigger signal reception antenna 31. When detecting a trigger signal, the trigger signal detection circuit 30 notifies the controller 26 of the detection. When detecting a trigger signal from the trigger signal detection circuit 30, the controller 26 causes a pressure sensor 27 to measure an air pressure. The transmitter 15 has a battery 32 and is activated by power supplied from the battery 32.

Figure 3:
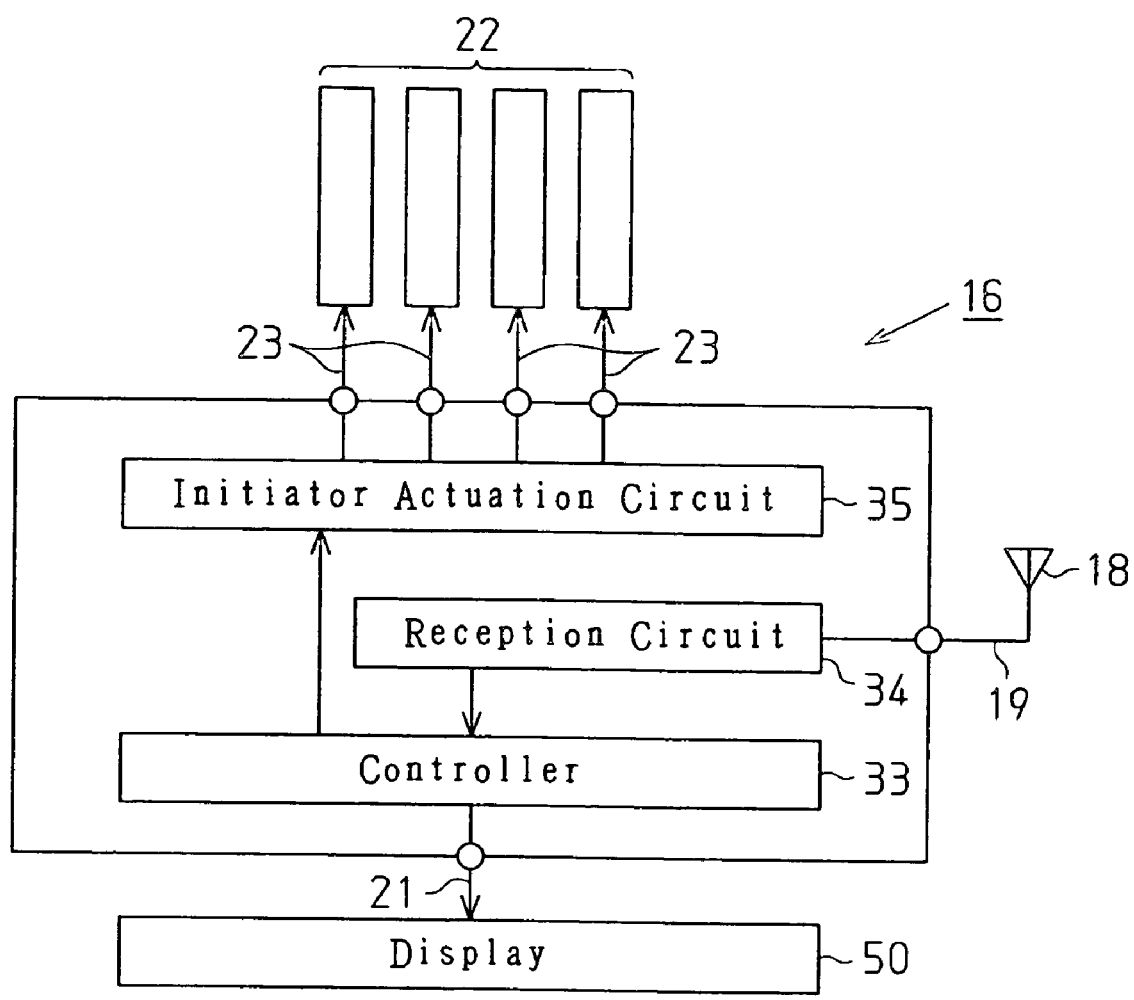
FIG. 3 is a block diagram showing the receiver in the tire monitoring apparatus of FIG. 1.

The configuration of the receiver 16 will be described in detail below. As shown in FIG. 3, each receiver 16 comprises a controller 33, which includes a microcomputer for processing reception data, and a reception circuit 34. The controller 33 includes, e.g., a CPU, ROM, and RAM. The reception circuit 34 functions as receiving means or a receiving device which receives, via the reception antenna 18, two or more determination signals including air pressure data transmitted from the transmitters 15. The reception circuit 34 demodulates and decodes the determination signal, and then sends the signal to the controller 33.

The controller 33 functions as determining means or a determining device which determines whether there is a match between, for example, the first two of determination signals having been received from the reception circuit 34. When the two determination signals match with each other, the controller 33 locates the position of the tire 14 based on which initiator 22 has been instructed to transmit the trigger signal, and processes air pressure data, which is included in the determination signals, as valid data. The controller 33 causes the display 20 to show data of the air pressure.

Furthermore, the receiver 16 comprises an initiator actuation circuit 35 for driving the initiators 22 corresponding to the transmitters 15. The initiator actuation circuit 35 is controlled by the controller 33 and wirelessly transmits trigger signals from the initiators 22, each of which corresponds to one of the transmitters 15, at regular time intervals (for example, every 15 seconds). The transmission timing of each initiator 22 is adjusted such that each initiator 22 wirelessly transmits the trigger signal at a timing that differs from that of the other initiators 22. Therefore, two or more of the initiators 22 do not wirelessly transmit trigger signals simultaneously.

At least a radio wave in the long wavelength range (LF: 30 kHz to 300 kHz) is used as the trigger signal. This is under the assumption that a reflected wave may be generated when the vehicle 12 reflects the trigger signal and so on. That is, there is less susceptibility to interference caused by reflected waves from the vehicle 12 when the trigger signal is in the long wavelength range. Therefore, the trigger signal reception antenna 31 of the transmitter 15 receives the trigger signal at any rotation angle of the tire 14. Accordingly, data representing the condition of the tire 14 can be transferred between the transmitter 15 and the receiver 16 even when the vehicle 12 is moving.

Furthermore, the output of the initiator actuation circuit 35 can be easily restricted when the trigger signal is in the long wavelength range. Thus, it is possible to limit the transmission range of the trigger signal transmitted from the initiator 22. That is, the output of the initiator actuation circuit 35 can be restricted to enable detection of only the trigger signal of the transmitter 15 that corresponds to predetermine one of the initiators 22. Therefore, for example, only the corresponding transmitter 15 detects the trigger signal transmitted from the initiator 22. Accordingly, when the receiver 16 receives a determination signal transmitted from the transmitter 15 corresponding to a trigger signal via the reception antenna 18, the tire 14 incorporating the transmitter 15 can be located with ease.

An operation of the tire condition monitoring apparatus 11 configured thus will be described below.

Figure 4:
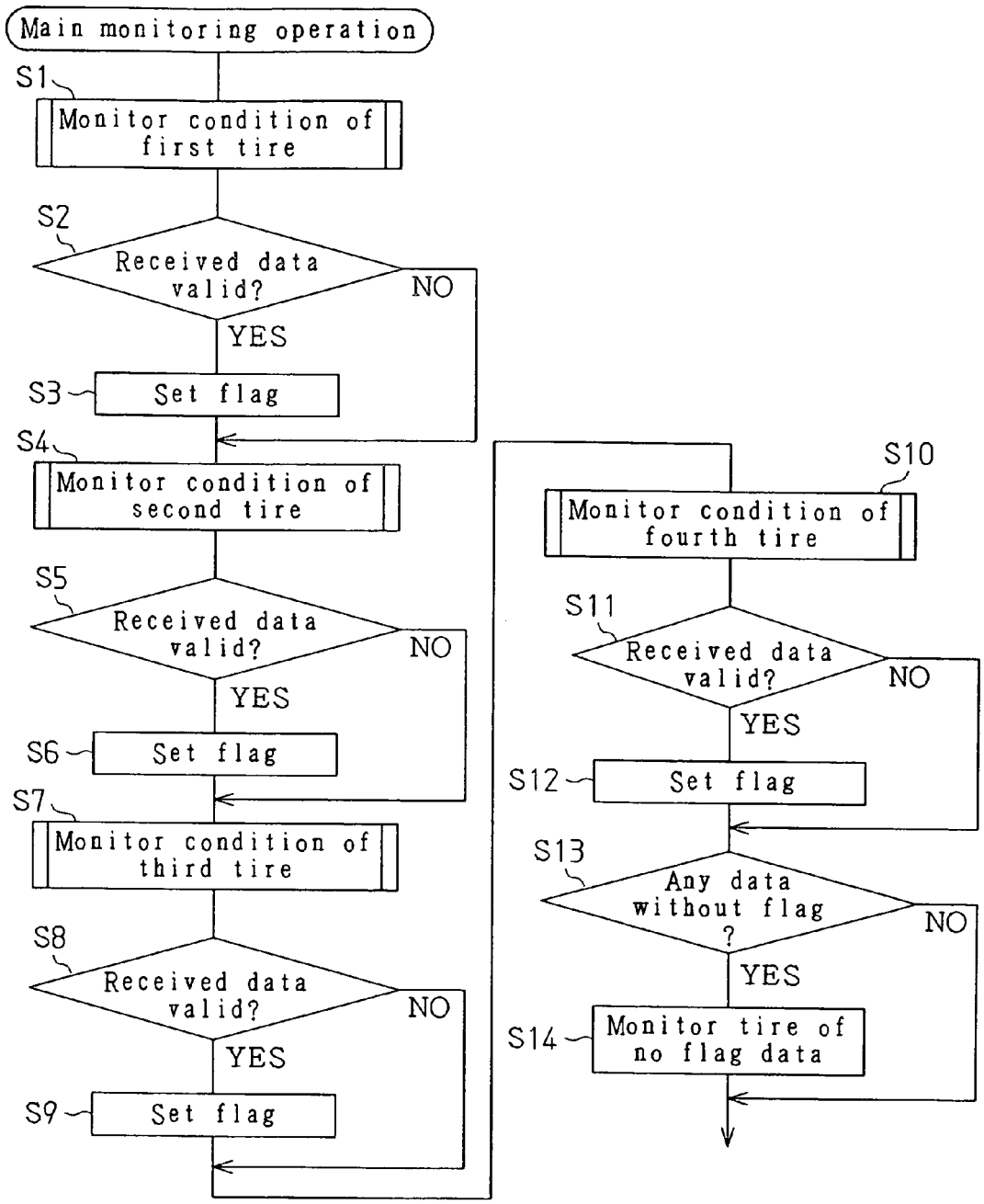
FIG. 4 is a flowchart showing the monitoring of all the tires by the tire condition monitoring apparatus of FIG. 1.

Referring to the flowchart of FIG. 4, the following will describe the main operation of sequentially monitoring the condition of the four tires 14 attached to the vehicle 12. The operation will be performed under the control of the CPU according to programs stored in the ROM of the controller 33 of the receiver 16.

In step S1, the condition of the first tire 14, which includes an air pressure, is monitored. The tires 14 are identified as first to fourth tires. In step S2, on the assumption that data received by the receiver 16 is identical to data transmitted from the transmitter 15 of the first tire 14, it is determined whether the reception data has been processed validly. When the reception data has been processed validly, the process advances to S3. When the reception data has not been processed validly, the process advances to S4. In S3, a flag is set in a predetermined area of the RAM of the controller 33 to indicate the completion of valid processing.

Thereafter, in step S4, the condition of the second tire 14, which includes an air pressure, is monitored. In S5 and S6, as in S2 and S3, it is determined whether reception data has been processed validly. When the data has been processed validly, a flag is set in the predetermined area of the RAM. Then, in S7 to S9, as in S1 to S3 and S4 to S6, the condition of the third tire 14 is monitored, it is determined whether reception data has been processed validly, and a flag is set when the data has been processed validly. Similarly in S10 to S12, the condition of the fourth tire 14 is monitored, it is determined whether reception data has been processed validly, and a flag is set when the data has been processed validly.

In S13, it is determined whether data with no flag is present in the predetermined area of the RAM of the controller 33. When data with no flag is present, in S14, a series of operations including the monitoring of condition is performed again for the tire 14 corresponding to the data. After valid flags are set for all the tires 14, the predetermined area is cleared in preparation for subsequent processing.

Figure 5B:
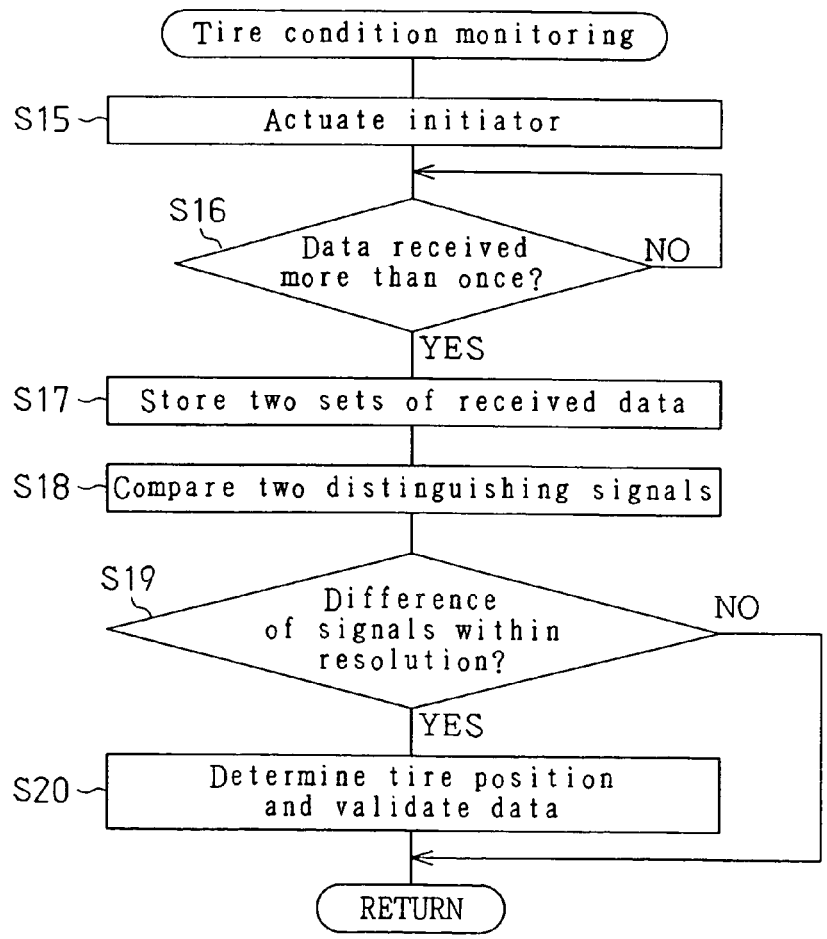
FIG. 5(b) is a flowchart showing the detail of the monitoring of a tire in the flowchart of FIG. 4.

The monitoring of the condition of the tires 14 will be described in detail below in accordance with the flowchart of FIG. 5(b).

In S15, under the control of the controller 33 of the receiver 16, a trigger signal is wirelessly transmitted from any one of the initiators 22 corresponding to one of the first to fourth tires 14. Then, in the transmitter 15 of the tire 14, the trigger signal is detected by the trigger signal detection circuit 30 and the air pressure of the tire 14 is measured by the pressure sensor 27 under the control of the controller 26 of the transmitter 15. Then, air pressure data obtained through the measurement is outputted to the transmission circuit 28 via the controller 26. In the transmission circuit 28, the air pressure data from the controller 26 is encoded and modulated, so that a determination signal is generated. The determination signal is wirelessly transmitted from the transmission antenna 29 two or more times in a fixed time period.

Subsequently, in S16, it is determined whether the reception circuit 34 of the receiver 16 has received two or more determination signals from the transmission circuit 28. When two or more determination signals are received, in S17, the RAM of the controller 33 stores, for example, data of the first two of the received determination signals. Thereafter, in S18 and S19, the two stored determination signals are compared with each other and it is determined whether a variation between the determination signals (error range) is a predetermined resolution or less (for example, ±1 resolution from the first signal). That is, when two or more data are received in quite a short time (e.g., 30 mm/sec) from the same tire, a variation between determination signals is generally a resolution of 1 or less. When two determination signals are within a predetermined range of resolutions, the process advances to S19. When two determination signals are not within the predetermined range of resolutions, the process goes back to the main routine of FIG. 4 and the subsequent operation is performed.

In S20, the position of the tire 14 is located based on which initiator 22 is instructed to transmit a trigger signal, and air pressure data included in the determination signal is processed as valid data. That is, data of the air pressure is shown on the display 20. Thereafter, the process goes back to the main routine of FIG. 4 and the subsequent operation is performed.

As described above, in the tire condition monitoring apparatus of the present embodiment, it is determined whether a variation between two determination signals is within the predetermined range of resolutions. The two determination signals include tire information about air pressure data and so on transmitted from the transmission circuit 28 of the transmitter 15. When the variation is within the predetermined range of resolutions, the position of the tire 14 is located and the tire information is processed as valid information. Thus, it is not necessary to register identification information beforehand for each tire 14. This configuration permits tire condition monitoring to be started quickly.

Two or more determination signals including tire information are transmitted for each of the tires 14 in a fixed time period, and it is determined whether a variation between two of the determination signals is within the predetermined range of resolutions. Hence, during the monitoring of tire condition of the vehicle 12, even when receiving a determination signal transmitted from a transmitter of another vehicle incorporating a similar tire condition monitoring apparatus, tire information included in the determination signal is never processed erroneously. Therefore, it is possible to properly obtain and process tire information including an internal air pressure for each of the tires 14. Incidentally, when receiving a determination signal from a tire of another vehicle, air pressure data in the signal is rarely within the predetermined range of resolutions, so that the data is almost negligible.

As described above, the first embodiment has the following advantages.

(1) It is not necessary to register identification information beforehand for each of the tires 14, thereby permitting tire condition monitoring to be started quickly.

(2) Even when receiving a determination signal transmitted from a transmitter of another vehicle incorporating a similar tire condition monitoring apparatus, tire information included in the determination signal is never processed erroneously.

(3) Since air pressure data is used to identify the tire 14, data only for identification is not necessary, thereby simplifying the configuration.

Second Embodiment

A second embodiment according to the present invention will be described below in accordance with the flowchart of FIG. 6. The differences from the first embodiment will mainly be discussed.

In the second embodiment, in order to identify four transmitters 15 provided in tires 14 of a vehicle 12, a specific ID code is registered beforehand as identification information in the ROM or RAM of an internal memory in a controller 26 of each transmitter 15. According to the flowchart of FIG. 6, the tires 14 are monitored in almost a similar manner to the first embodiment.

That is, in S21, a trigger signal is wirelessly transmitted from any one of initiators 22 and is detected by a trigger signal detection circuit 30 of the corresponding transmitter 15. Then, in the corresponding transmitter 15, the air pressure of the tire 14 is measured by a pressure sensor 27 under the control of the controller 26. Further, an ID code is read from the internal memory of the controller 26, and air pressure data obtained through the measurement and data including the ID code are outputted to a transmission circuit 28. In the transmission circuit 28, data from the controller 26 is encoded and modulated, so that a determination signal including the air pressure data and the ID code is generated, and the determination signal is wirelessly transmitted from a transmission antenna 29 two or more times in a fixed time period.

In S22, it is determined whether a reception circuit 34 of a receiver 16 has received the two or more determination signals from the transmission circuit 28. When two or more determination signals are received, for example, the first two of the received determination signals are stored in the RAM of a controller 33 in S23. Thereafter, in S24 and S25, the ID codes of the stored two determination signals are compared with each other to determine whether the ID codes match with each other. When the ID codes match with each other, the process advances to S26 and the position of the tire 14 is located based on the ID codes and the air pressure data is processed as valid data.

Therefore, the second embodiment can obtain almost the same advantages as the items (1) and (2) of the first embodiment.

Third Embodiment

A third embodiment according to the present invention will be described below in accordance with the flowchart of FIG. 7. The differences from the first embodiment will mainly be discussed.

In the third embodiment, a controller 26 of each transmitter 15 functions as storage means or a storage device for storing identification information of the corresponding tire 14. Specific ID codes are registered beforehand as identification information in the ROM or RAM of an internal memory of the controller 26. Initiators 22 corresponding to the transmitters 15 function as, in addition to trigger signal transmitting means or devices, instruction signal transmitting means or devices for wirelessly transmitting an instruction signal for instructing each transmitter 15 to transmit an identification signal based on the ID code stored in the internal memory of the controller 26. A transmission circuit 28 of each transmitter 15 functions as identification signal transmitting means or an identification signal transmitting device for wirelessly transmitting an identification signal, in response to the instruction signal from the corresponding initiator 22, based on the ID code together with data of an air pressure measured by a pressure sensor 27.

Moreover, a reception circuit 34 of a receiver 16 functions as receiving means or a receiving device for receiving an air identification signal including air pressure data transmitted from each transmission circuit 28. A controller 33 of the receiver 16 functions as determining means or a determining device which determines whether there is a match between the identification signal having been received by the reception circuit 34 and the identification signal having been instructed to any of the initiators 22. When there is a match, the position of the tire 14 is located and the air pressure data is processed as valid data. Then, under the control of the controller 33 of the receiver 16, the tares 14 are monitored according to the flowchart of FIG. 7.

That is, in S27, under the control of the controller 33 of the receiver 16, an instruction signal such as a trigger signal for instructing an identification signal to be transmitted is wirelessly transmitted from any one of the initiators 22. Then, in the corresponding transmitter 5, the instruction signal is detected by a trigger signal detection circuit 30. Under the control of the controller 26, the air pressure of the tire 14 is measured by a pressure sensor 27. Moreover, the ID code is read from the internal memory of the controller 26, and air pressure data measured by the pressure sensor 27 and data including the ID code are outputted to the transmission circuit 28. In the transmission circuit 28, data from the controller 26 is encoded and modulated, so that transmission data including the air pressure data and the ID code is generated, and the data is wirelessly transmitted from a transmission antenna 29.

Subsequently, in S28, it is determined whether the reception circuit 34 of the receiver 16 has received the data from the transmission circuit 28. When the data has been received, the received data is stored in the RAM of the controller 33 in S29. Thereafter, in S30 and S31, a comparison is made between the ID code included in the stored reception data and the ID code instructed by the controller 33 to the initiator 22, and it is determined whether the ID codes match with each other. When the ID codes match with each other, the process advances to S32. When the ID codes do not match with each other, the process advances to S33.

In S32, the position of the tire 14 is located based on the matching ID codes and the air pressure data included in the reception data is processed as valid data. That is, data of the air pressure is shown on a display 20. Therefore, the process goes back to the main routine of FIG. 4 and the subsequent operation is performed. Meanwhile, in S33, it is determined whether the number of mismatches of the ID codes reaches the predetermined number of times (e.g., two) for each trigger signal. When the number of mismatches reaches the predetermined number of times, the process advances to S34. When the number of mismatches does not reach the predetermined number of times, the process goes back to the main routine of FIG. 4 and the subsequent operation is performed. In S34, on the assumption that an abnormality occurs in the controller 33 and so on of the receiver 16, abnormality processing is performed that includes the display of the abnormality on the display 20. Thereafter, the process goes back to the main routine of FIG. 4 and the subsequent operation is performed.

Therefore, in addition to the same effects as the items (1) and (2) of the first embodiment, the third embodiment provides the following advantage.

(4) An abnormality in the controller 33 and so on of the receiver 16 can be detected using the ID codes.

(Modifications)

It should be apparent to those skilled in the art that the present invention may be embodied in many other specific forms without departing from the spirit or scope of the invention. Particularly, it should be understood that the invention may be embodied in the following forms.

The minimum resolution may be set at, for example, 2 kPa other than 2.5 kPa.

Figure 7:
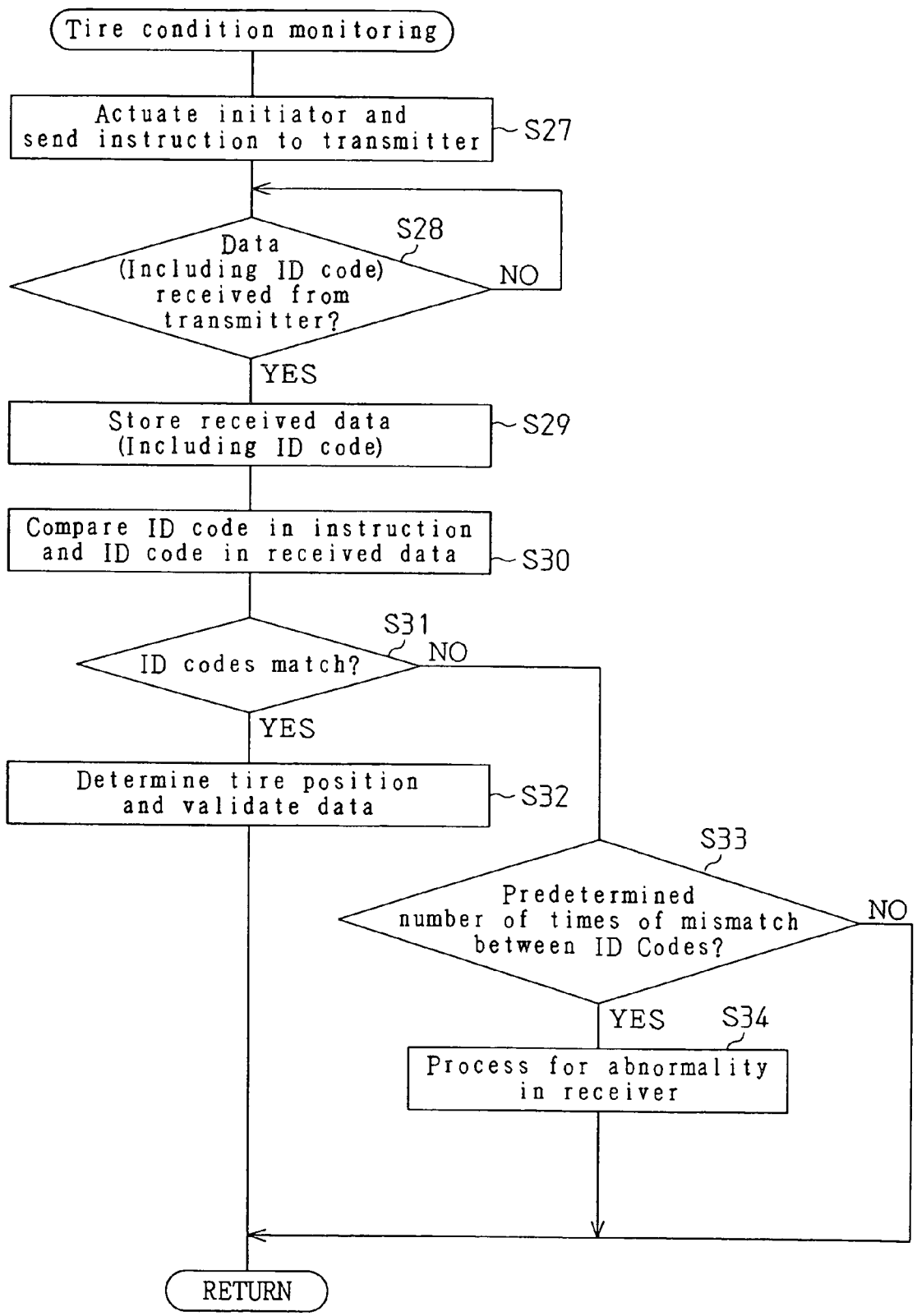
FIG. 7 is a flowchart showing the monitoring of a tire in a tire condition monitoring apparatus according to a third embodiment.

During the monitoring of tire condition in the first and second embodiments, as in the third embodiment shown in S33 and S34 of the flowchart of FIG. 7, the number of mismatches may be determined and abnormality processing such as the display of an abnormality may be performed.

When there is an abnormality in the pressure of any of the tires 14, the abnormality may be indicated by a sound. In addition, a speaker mounted on the vehicle 12 may be used as an informing device.

The air pressure information transmitted from each transmitter 15 may be data specifically indicating the value of the air pressure or data that simply indicates that the air pressure is included in a tolerable range.

A temperature sensor may be provided in each transmitter 15 and air pressure data and temperature data in the corresponding tire 14 may be wirelessly transmitted from the transmitter 15 as data indicating tire condition.

Other than four-wheeled vehicles, the present invention may be applied to two-wheeled vehicles, such as bicycles and motor cycles, multi-wheeled busses, multi-wheeled towed vehicles and industrial vehicles such as forklifts. When the present invention is applied to a trailer, the receiver 16 and the display 20 are provided in the tractor.

Therefore, the present examples and embodiments are to be considered as illustrative and not restrictive and the invention is not to be limited to the details given herein, but may be modified within the scope and equivalence of the appended claims.

The invention claimed is:

1. A tire condition monitoring apparatus, having a plurality of tire information transmitting devices, each provided in one of tires of a vehicle, wherein each tire information transmitting device wirelessly transmits tire information, wherein the tire condition monitoring apparatus receives the tire information from the tire information transmitting devices and monitors a condition of each tire, the apparatus comprising:

a plurality of trigger signal transmitting devices, each of which corresponds to one of the tire information transmitting devices, wherein each trigger signal transmitting device wirelessly transmits a trigger signal to the corresponding tire information transmitting device;

a plurality of determination signal transmitting devices, each of which is provided in one of the tire information transmitting devices, wherein each determination signal transmitting device wirelessly transmits a predetermined determination signal two or more times within a fixed time period based on the trigger signal from the corresponding trigger signal transmitting device, the determination signal including the tire information;

a receiving device which receives the determination signals from the determination signal transmitting devices; and a determining device which determines whether there is a match between a plurality of determination signals received by the receiving device and, when there is a match, locates a position of the corresponding tire and processes the tire information as valid information;

wherein each determination signal transmitting device encodes and wirelessly transmits data of an air pressure of the corresponding tire two or more times, and wherein the determining device determines whether two determination signals indicative of the encoded air pressure data are included in a predetermined error range, thereby determining whether there is a match between the determination signals.

2. The tire condition monitoring apparatus according to claim 1, wherein the predetermined error range is less than a minimum resolution.

* * * * *

UNITED STATES PATENT AND TRADEMARK OFFICE
CERTIFICATE OF CORRECTION

PATENT NO. : 7,253,726 B2  Page 1 of 1
APPLICATION NO. : 11/069813
DATED : August 7, 2007
INVENTOR(S) : Youichi Okubo It is certified that error appears in the above-identified patent and that said Letters Patent is hereby corrected as shown below:

Column 3
Line 8, delete "tirelessly" and insert therefor -- wirelessly --.

Column 8
Line 59, delete "tares" and insert therefor -- tires --.

Signed and Sealed this

Twenty-seventh Day of November, 2007

JON W. DUDAS
*Director of the United States Patent and Trademark Office*